United States Patent
Wentworth et al.

(10) Patent No.: US 6,470,129 B1
(45) Date of Patent: Oct. 22, 2002

(54) MODULAR CABLE MANAGEMENT TROUGH SECTION

(75) Inventors: Michael J. Wentworth, Belle Plaine; Brian L. Johnson, Maple Grove; Wayne Johnson, Rosemount; Thomas W. Kampf, Minnetonka; John Van Scoy, Shakopee; Alex Watts, Minnetonka, all of MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/684,643

(22) Filed: Oct. 10, 2000

(51) Int. Cl.[7] .................................................. G02B 6/00
(52) U.S. Cl. ..................................................... 385/134
(58) Field of Search ................................ 385/100, 134, 385/135, 136, 137; 174/102 D (56) References Cited

U.S. PATENT DOCUMENTS

| | | |
|---|---|---|
| 5,067,678 A | 11/1991 | Henneberger et al. |
| 5,160,811 A | 11/1992 | Ritzmann |
| 5,161,580 A | 11/1992 | Klug |
| 5,240,209 A | 8/1993 | Kutsch |
| 5,271,585 A | 12/1993 | Zetena, Jr. |
| 5,316,243 A | 5/1994 | Henneberger |
| 5,316,244 A | 5/1994 | Zetena, Jr. |
| 5,335,349 A | 8/1994 | Kutsch et al. |
| 5,503,354 A | 4/1996 | Lohf et al. |
| 5,752,781 A | 5/1998 | Haataja et al. |
| 5,792,992 A * | 8/1998 | Handler ........................ 174/101 |
| 5,836,148 A * | 11/1998 | Fukao .......................... 59/78.1 |
| 5,839,476 A * | 11/1998 | Blase .......................... 138/120 |
| 5,923,753 A | 7/1999 | Haataja et al. |
| 5,937,131 A | 8/1999 | Haataja et al. |
| 5,995,699 A | 11/1999 | Vargas et al. |
| 6,037,538 A | 3/2000 | Brooks |
| 6,076,779 A | 6/2000 | Johnson |
| 6,263,144 B1 * | 7/2001 | Daoud .......................... 385/135 |
| 6,270,287 B1 * | 8/2001 | Gray ........................... 405/100 |
| 6,298,191 B1 * | 10/2001 | Daoud .......................... 385/137 |

OTHER PUBLICATIONS

ADC Telecommunications brochure entitled "FiberGuide® Fiber Management Systems," 33 pages, dated Oct., 1995.
Warren & Brown & Staff brochure pages entitled "lightpaths," Issue 2, 11 pages, dated 1995.
ADC Telecommunications brochure entitled "Fiber Guide™ Fiber Management Systems," 6 pages, dated Jun., 1989.
ADC Telecommunications brochure entitled "ADC FiberGuide® System Express Exit™ 2×2," 2 pages, dated May 1999.
ADC Telecommunications brochure entitled "FiberGuide® Fiber Management Systems," 37 pages, dated June 1998.

* cited by examiner

Primary Examiner—Khiem Nguyen
Assistant Examiner—Thanh-Tam Le
(74) Attorney, Agent, or Firm—Merchant & Gould P.C.

(57) ABSTRACT

A modular cable management trough system and method of assembly. Cable management trough includes a trough body having first and second terminal ends, first and second upright walls extending between the first and second terminal ends, and a base wall between the first and second upright walls, extending between the first and second terminal ends. The first and second upright walls and the base wall define a generally U-shaped trough having an open top and a trough interior for receiving at least one telecommunications cable. The trough body defines a receiving channel at the first end of the trough body. The channel has upright portions along the first and second upright walls and a base portion along the base wall. The channel may slidably receive a flanged end of an adjacent trough section in order to couple the adjacent trough section to modular trough section.

16 Claims, 9 Drawing Sheets

MODULAR CABLE MANAGEMENT TROUGH SECTION

FIELD OF THE INVENTION

This invention pertains to a system for the management and routing of cables, such as telecommunications cables. More particularly, this invention pertains to a trough section.

BACKGROUND OF THE INVENTION

In the telecommunications industry, the use of optical fibers for signal transmission is accelerating. With the increased utilization of optical fiber systems, optical fiber cable management requires industry attention. Similar issues exist with other telecommunications cables such as copper-based cables.

One area of telecommunications cable management that is necessary is the routing of cables from one piece of equipment to another. For example, in a telecommunications facility, optical fiber cables may be routed between fiber distribution equipment and optical line terminating equipment. In buildings and other structures which carry such equipment, the cable routing can take place in concealed ceiling areas or in any other manner to route cables from one location to another. Accordingly, such routing systems often include a plurality of trough members, fittings and couplings for routing the cables. U.S. Pat. Nos. 5,067,678; 5,316,243; and 5,752,781 show various cable routing systems.

When routing optical fibers, it is desirable that the routing system will be easy to install. For example, providing a continuous cable path throughout the system can be a challenge, such as when obstacles or misalignments arise during installation of the system. There is a need for devices which make system installation easier and less reliant on precisely aligned components.

U.S. Pat. No. 6,076,779 to Johnson discloses an apparatus for linking misaligned cable troughs. The Johnson device uses a number of different materials other than the preferred plastic. There is a need for an improved, cost effective system for making small adjustments in the alignment of a cable management trough.

SUMMARY OF THE INVENTION

The present invention concerns modular trough sections for use in a trough system. The modular trough sections may be quickly and easily snap-fitted together through the use of a channel and flange arrangement. An assembly of modular trough sections may include angled trough sections so that the trough assembly does not define a linear path.

A preferred embodiment of a modular trough section in accordance with the present invention includes a trough body having first and second terminal ends, first and second upright walls extending between the first and second terminal ends, and a base wall between the first and second upright walls, extending between the first and second terminal ends. The first and second upright walls and the base wall define a generally U-shaped trough having an open top and a trough interior for receiving at least one telecommunications cable. The trough body defines a receiving channel at the first end of the trough body. The channel has upright portions along the first and second upright walls and a base portion along the base wall. The channel may slidably receive a flanged end of an adjacent trough section in order to couple the adjacent trough section to the modular trough section.

The modular trough section may be adapted with a flange at its second end so that the modular trough section may be coupled to a second modular trough section also having a receiving channel.

The modular trough sections may then be shaped such that the receiving channel is angled relative to the second end of the trough body. By combining differently angled trough sections a cable management trough may be constructed which does not have a linear cable pathway. In this manner, obstacles and misaligned components may be circumnavigated or aligned with a cable trough.

DETAILED DESCRIPTION OF THE PREFERRED EMBODIMENTS

The present invention concerns a cable management system that includes snap fitted modular trough sections some of which may be angled. The cable management system may include additional horizontal trough sections, vertical sections, junctions and couplings. The trough section of the present invention allows for use in cable management systems where two ends of the trough section are not linearly aligned. Examples of situations where the ends are not linearly aligned include corrections of misalignments, and transitioning through offsets or directional changes. Also, the trough section of the present invention may be used for avoidance of obstacles where the ends are linearly aligned, but the adjoining section is circuitous.

Figure 20:
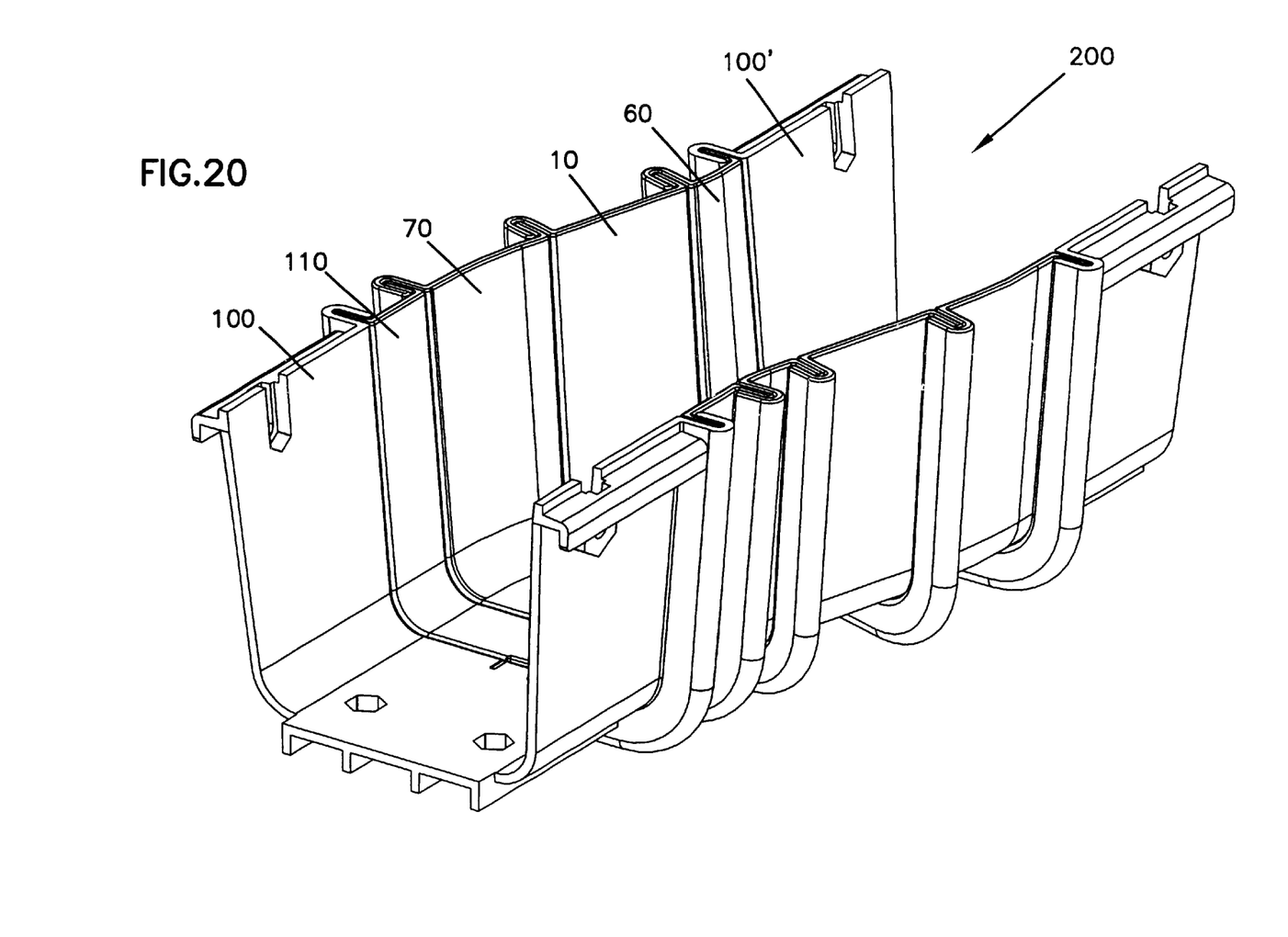
FIG. 20 is a perspective view of an assembly of modular trough sections according to the present invention.
Figure 21:
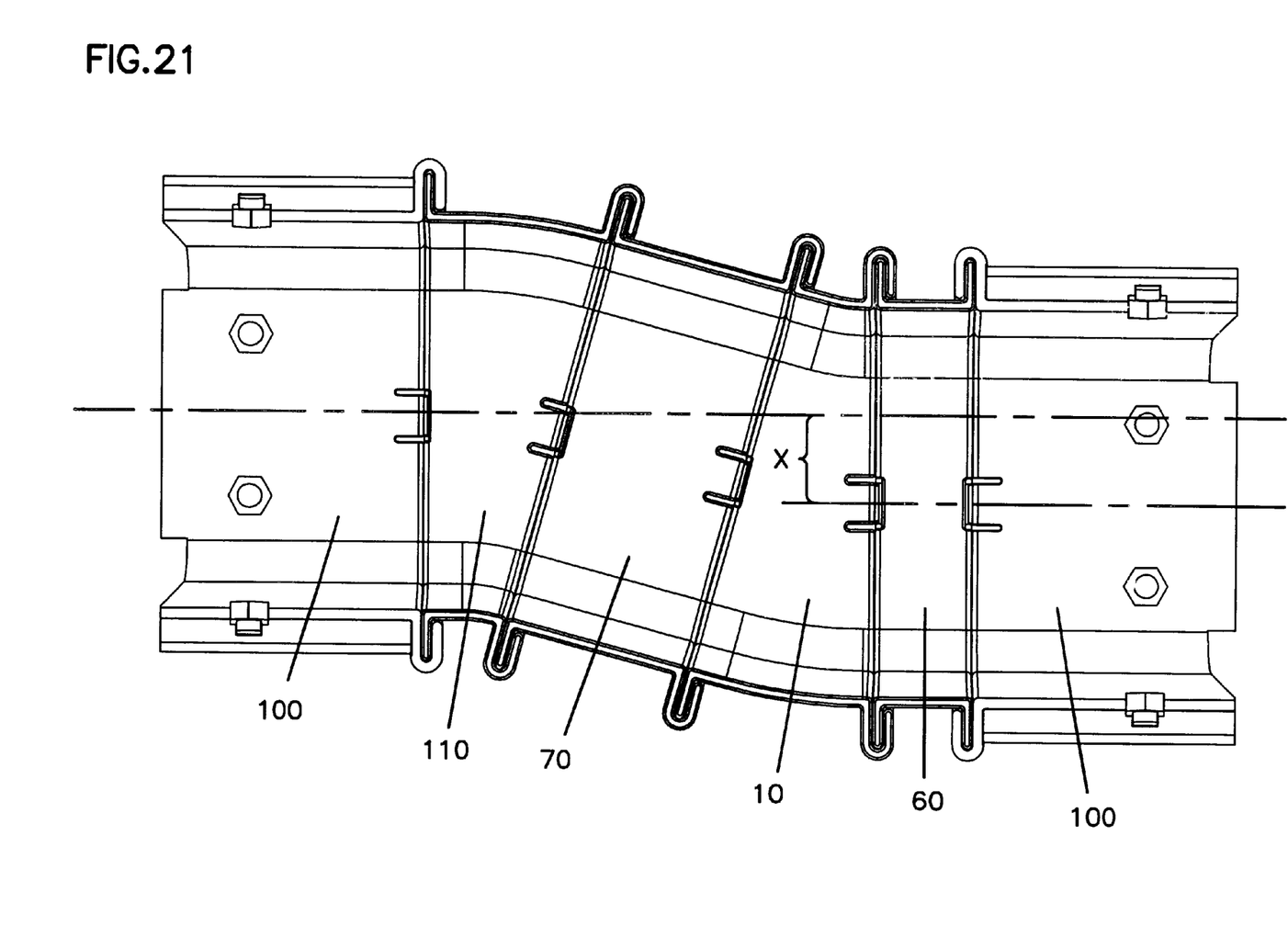
FIG. 21 is a top view of the assembly of FIG. 20.
Figure 22:
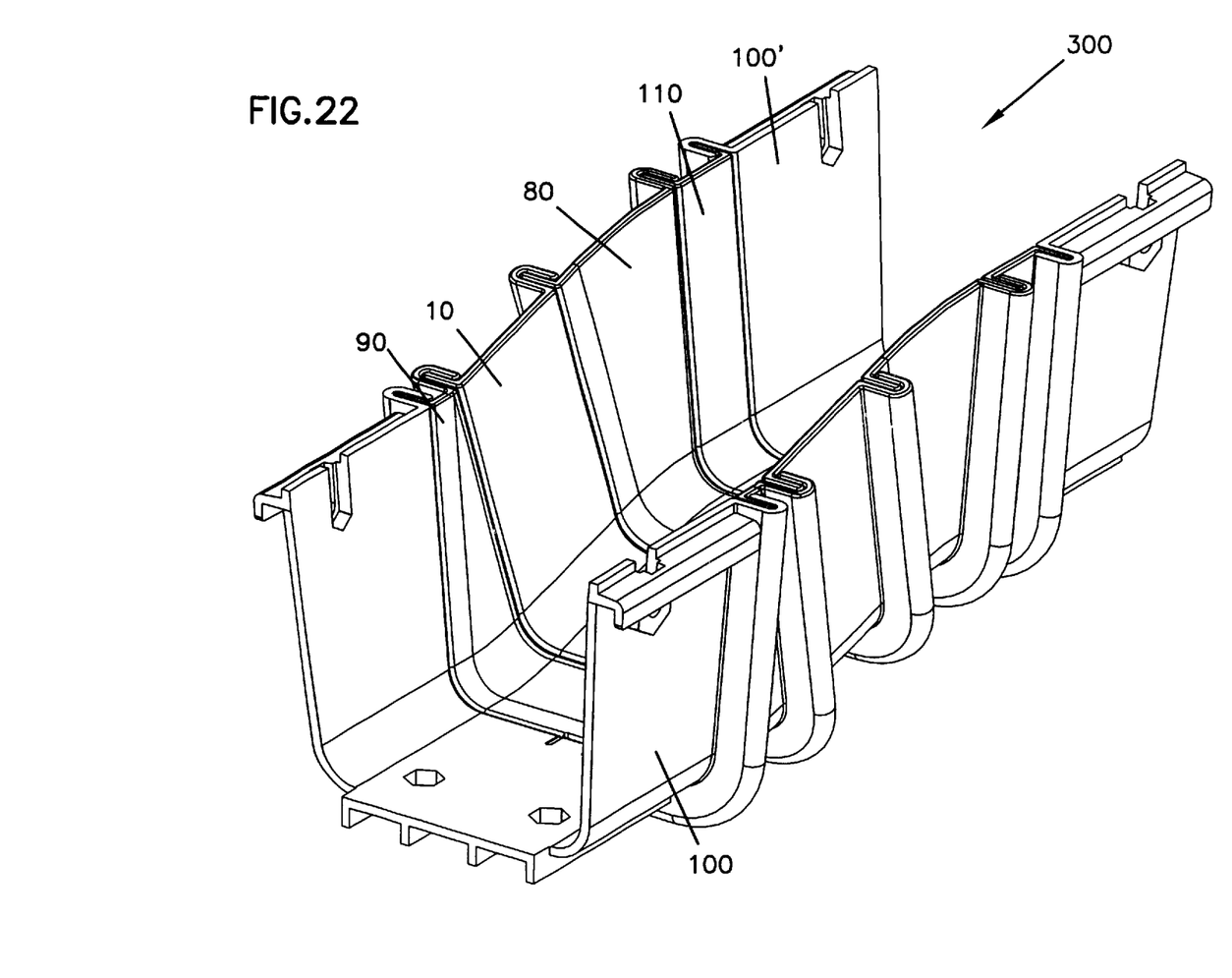
FIG. 22 is a perspective view of an alternative embodiment of an assembly of modular trough section according to the present invention.
Figure 23:
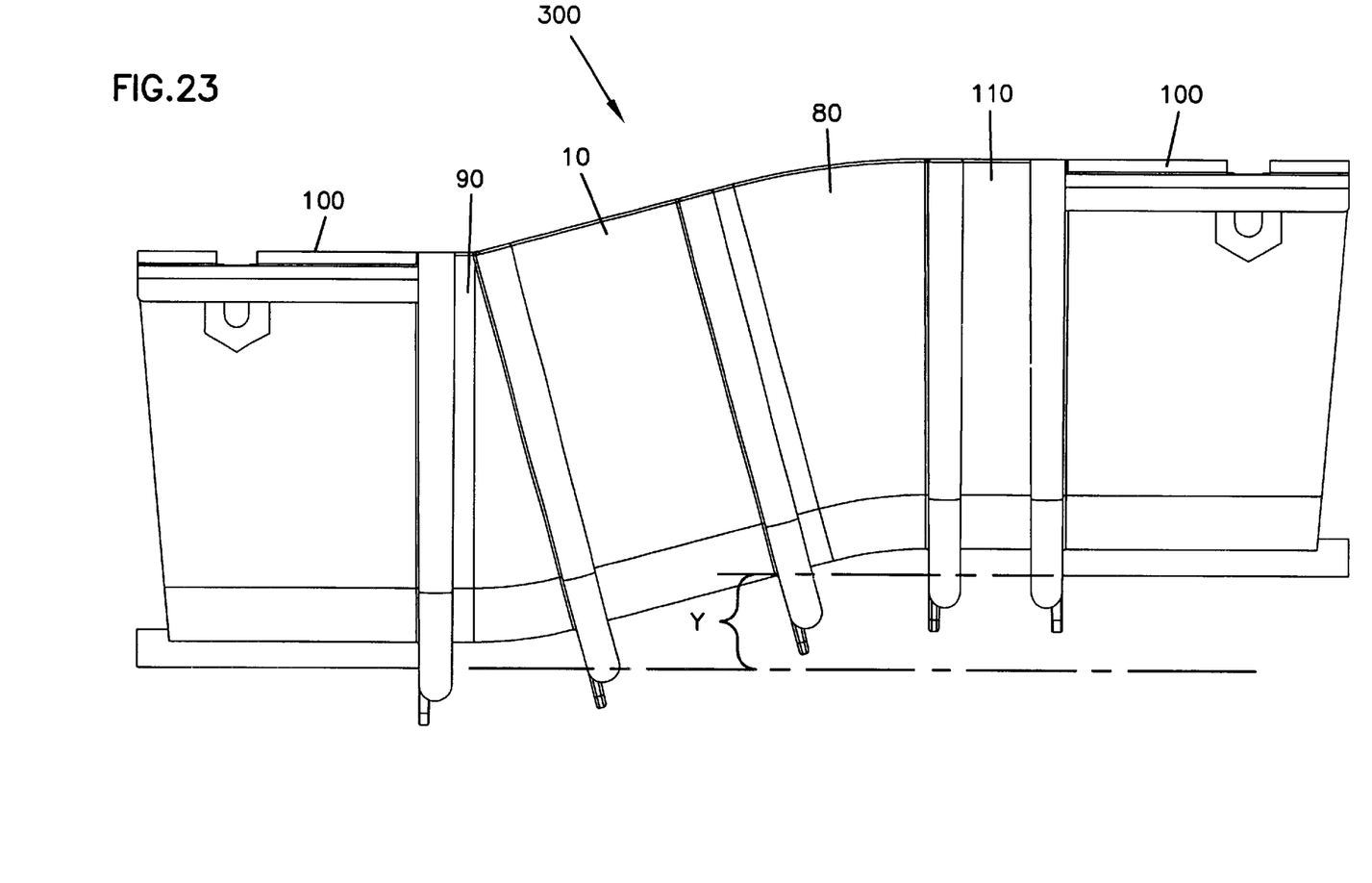
FIG. 23 is a side view of the assembly of FIG. 22.

The trough section of the present invention is a linking trough section and may take a number of shapes to link two trough sections or other system components. FIGS. 20 and 21 show one form of a trough section that transitions horizontally between linear ends in the orientation shown. FIGS. 22 and 23 show another form of a trough section that transitions vertically between linear ends in the orientation shown. Numerous other configurations are possible, as will be discussed below in greater detail.

Figure 1:
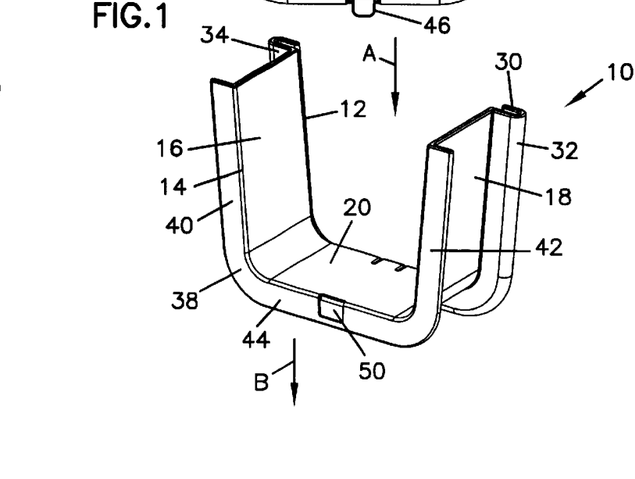
FIG. 1 is a perspective view of straight trough section according to the present invention.
Figure 2:
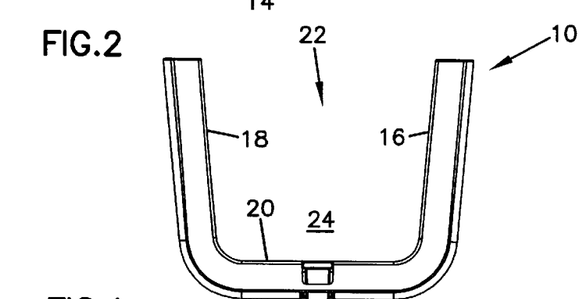
FIG. 2 is an end view of the trough section of FIG. 1.
Figure 3:
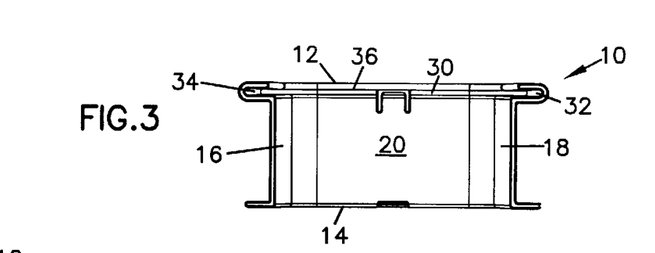
FIG. 3 is a top view of the trough section of FIG. 1.

Referring now to FIGS. 1–3, a trough member or trough section 10 is shown including ends 12, 14 for connection to other cable management structures in a cable management system. Trough section 10 includes generally vertical or upright sidewalls 16, 18, and a connecting horizontal base or bottom wall 20. Trough section 10 defines an open top 22. A trough interior 24 receives one or more telecommunications cables. Trough section 10 generally has a U-shaped cross-section as best shown in FIG. 2.

At end 12 the trough section 10 defines a receiving channel 30. Channel 30 follows the same U-shape as the trough section 10. Therefore, the channel 30 has upright portions 32 and 34 along the first and second upright walls 16 and 18 as well as a base portion 36 along the base wall 20.

At end 14 the trough section 10 defines a flange 38. The flange 38 flares away from the trough interior 24. The flange 38 has upright portions 40 and 42 along the first and second upright walls 16 and 18 as well as a base portion 44 along the base wall 20.

The channel 30 receives a flange of an adjacent trough section similar to the flange 38 in order to snap-fit the two sections together. The flange of an adjacent trough section is slidably inserted into the channel 30 from the open top 22 of trough section 10 in the direction of Arrow A. Similarly end 14 of trough section 10 can be coupled to a trough section adjacent end 14, by sliding flange 38 into a receiving channel configured like channel 30 on trough section 10 in the direction of Arrow B.

Figure 4:
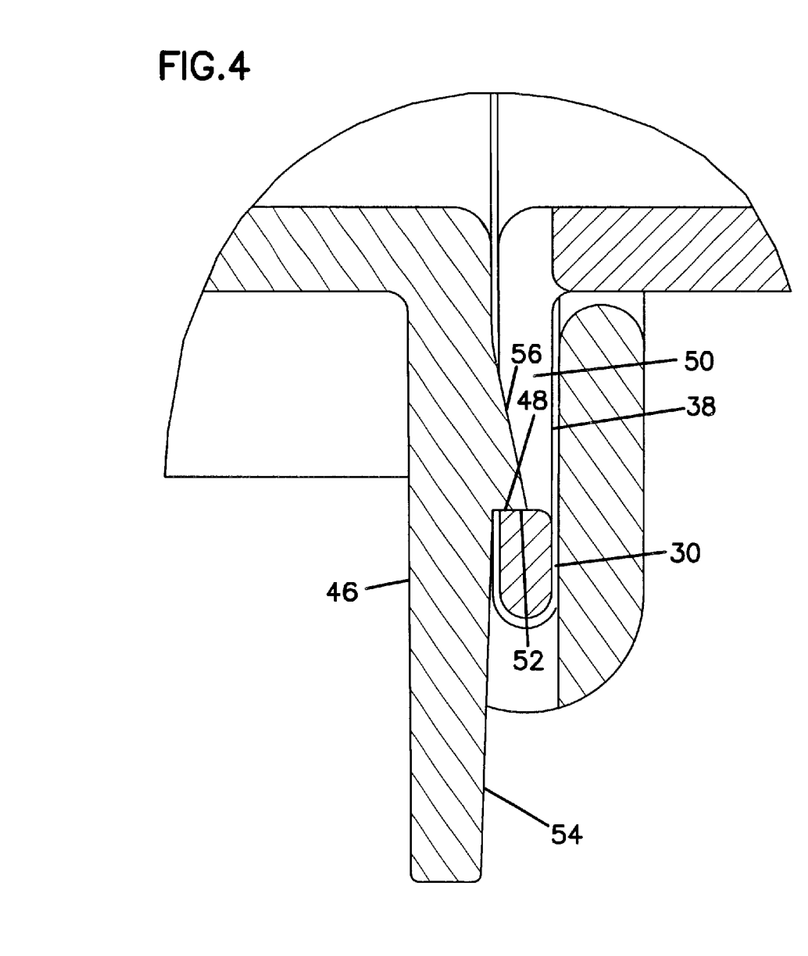
FIG. 4 is a cross section of a retaining tab engaging a retention slot according to the present invention.

Trough section 10 preferably includes a retaining tab 46 or other retaining arrangement. Retaining tab 46 cooperates with a retention slot 50 in the flange 38 of the adjacent trough section to hold the flange within the receiving channel 30. FIG. 4 is a cross section of a retaining tab 46 of a receiving channel 30 engaging a retention slot 50 to hold the flange 38 in the channel 30. Retaining tab 46 defines a ledge 48 which is opposed by an opposing ledge 52 defined by the retention slot 50 of the flange 38. The retaining tab 46 preferably includes an inclined surface 56 which allows the flange 38 to slide against the retaining tab 46 until ledge 48 engages opposing ledge 52. The retaining tab 46 includes a push-surface 54 which when depressed disengages ledge 48 from opposing ledge 52 allowing the flange 38 to be removed from the channel 30 thereby decoupling two trough sections. Other retaining structures are possible, such as other snaps or detents to retain the two trough sections together.

Figure 5:
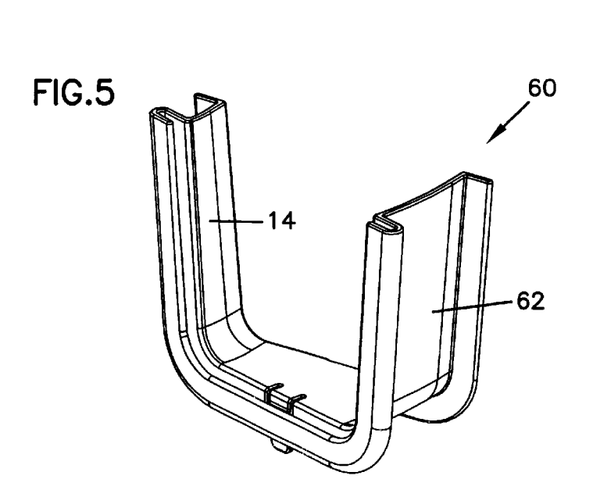
FIG. 5 is a perspective view of an angled trough section, angled in a first direction according to the present invention.
Figure 6:
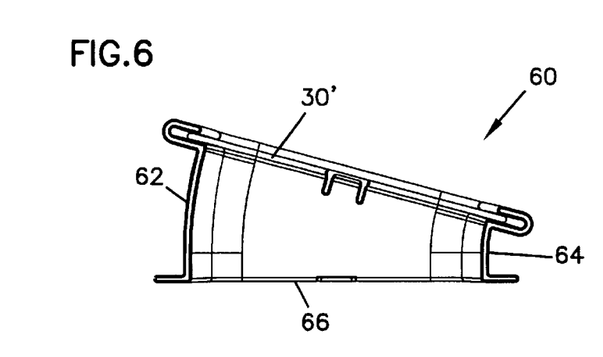
FIG. 6 is a top view of the trough section of FIG. 5.
Figure 7:
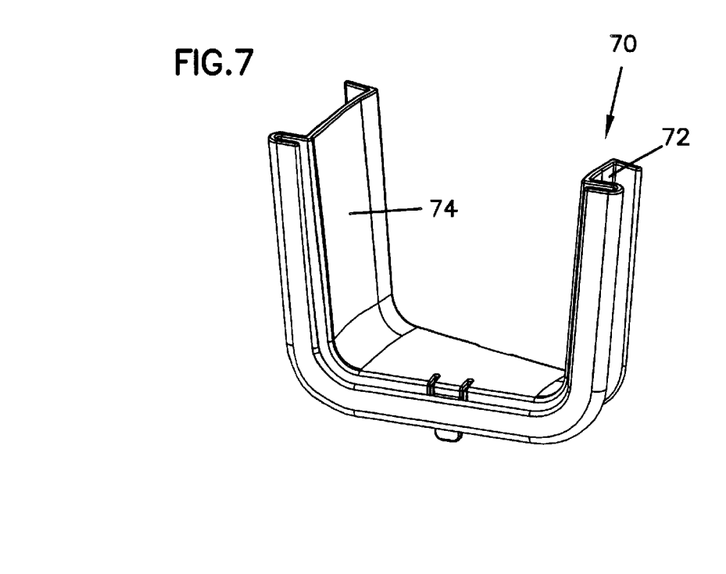
FIG. 7 is a perspective view of an angled trough section angled in a second direction according to the present invention.
Figure 8:
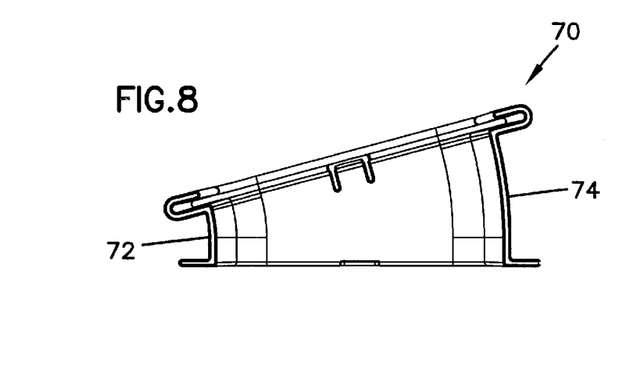
FIG. 8 is a top view of the trough section of FIG. 7.

Various modular trough sections can be made using the flange and channel designs to provide for non-linear cable pathways. For instance as shown in FIGS. 5 and 6, an angled trough section 60 is shown where the first upstanding wall 62 is longer that the second upstanding wall 64. Both upstanding walls are slightly curved. This allows the receiving channel 30' to be angled in a first direction relative the opposite, flanged end 66 of the trough section 60. FIGS. 7 and 8 show a similar angled trough section 70, being angled in a second opposite direction. In angled trough section 70 the second upstanding wall 74 is longer than the fist upstanding wall 72. By varying the difference between the upstanding wall lengths, a range of angles may be created including the angles between 0 and 90 degrees. Preferably a side angled modular trough section as shown in FIGS. 5–8 is angled at 10–30 degrees. For example a 15 degree angle may be used.

Figure 9:
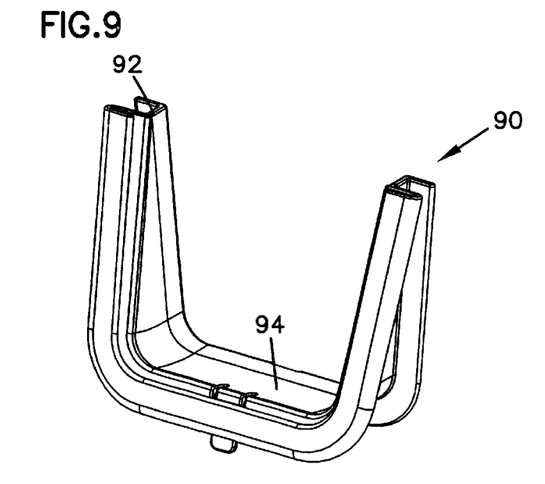
FIG. 9 is a perspective view of an angled trough section angled in a third direction according to the present invention.
Figure 10:
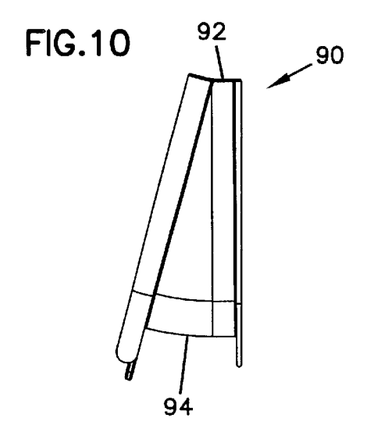
FIG. 10 is a side view of the trough section of FIG. 9.
Figure 11:
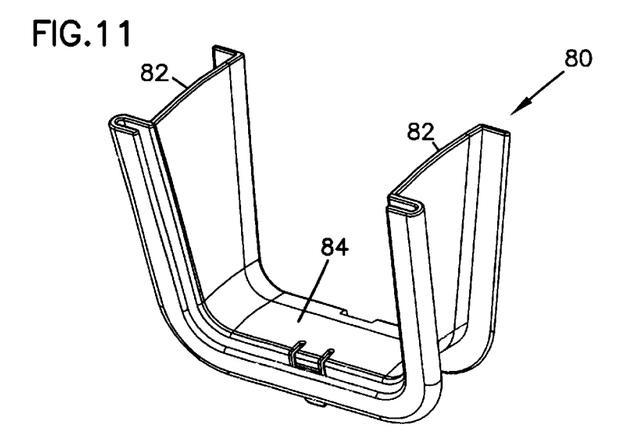
FIG. 11 is a perspective view of an angled trough section angled in a fourth direction according to the present invention.
Figure 12:
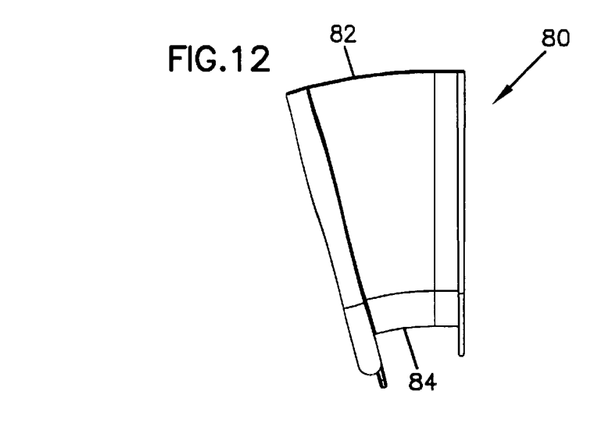
FIG. 12 is a side view of the trough section of FIG. 11.
Figure 13:
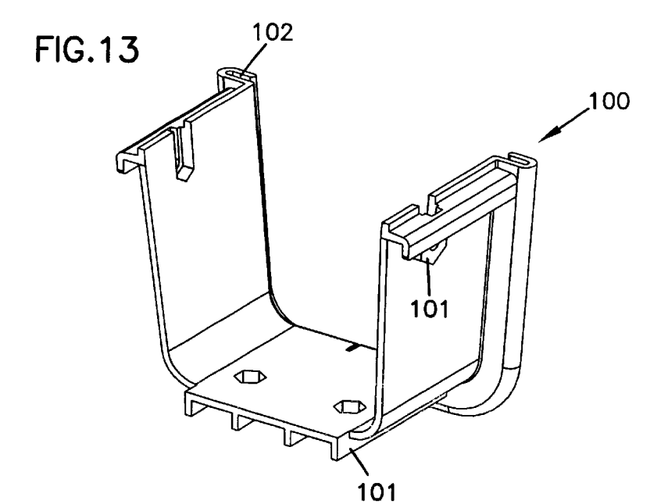
FIG. 13 is a perspective view of an end of a linear trough member adapted with a receiving channel according to the present invention.
Figure 14:
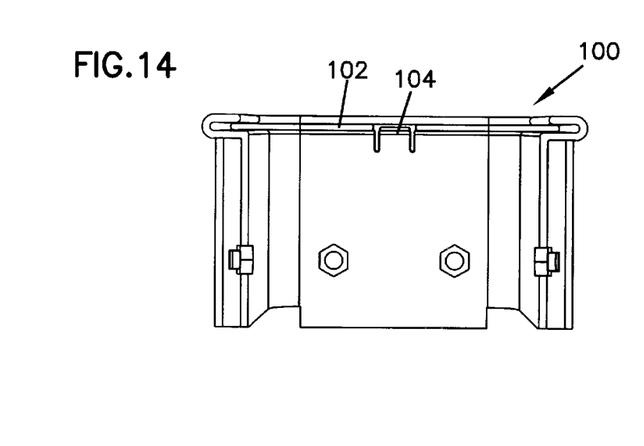
FIG. 14 is a top view of the trough section of FIG. 13.
Figure 15:
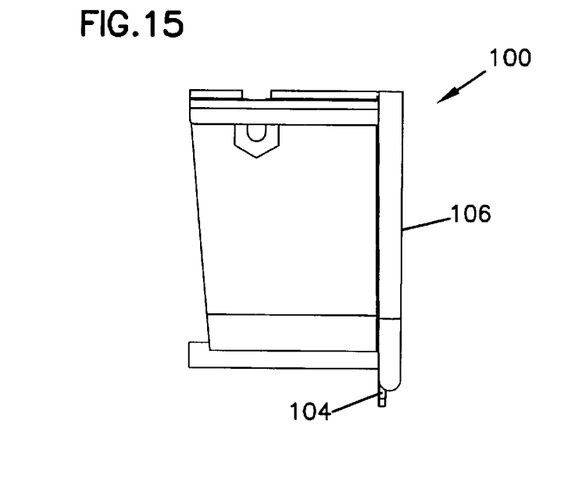
FIG. 15 is a side view of the trough section of FIG. 13.
Figure 16:
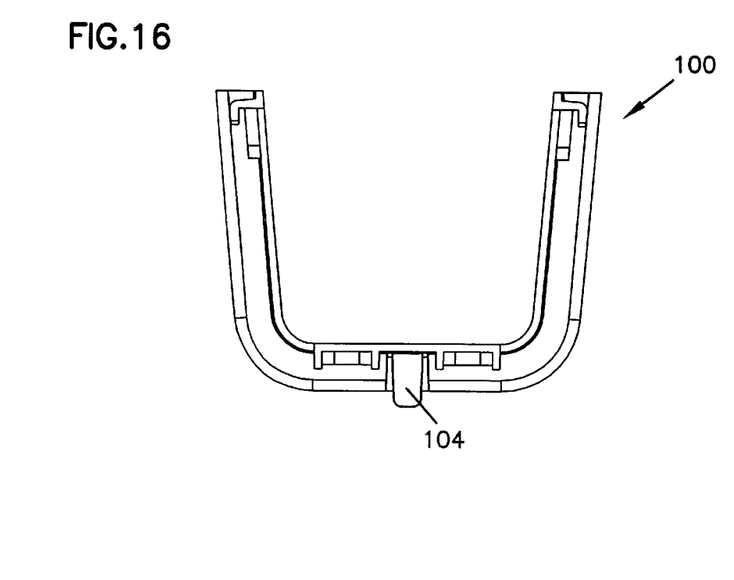
FIG. 16 is an end view of the trough section of FIG. 13.

The modular trough sections may also be angled in third and fourth directions which may be orthogonal to the first and second directions. FIGS. 9 and 10 show an upwardly angled modular trough section 90 in which a top edge 92 of each upstanding wall is shorter than the bottom wall 94. FIGS. 11 and 12 show a downwardly angled modular trough section 80 in which a top edge 82 of each upstanding walls is longer than the bottom wall 84. By varying the difference between the upstanding wall lengths, a range of angles may be created including the angles between 0 and 90 degrees. Preferably an angled modular trough section as shown in FIGS. 9–12 is angled at 10–30 degrees. For example, an angle of 15 degrees may be used.

FIGS. 13–16 shows an end 106 of a linear cable trough member 100 defining a U-shaped trough adapted with a receiving channel 102 and retaining tab 104. Trough member 100 includes exterior structure 101 to enable it to mount to other system components. By adapting the linear trough member 100 with a receiving channel 102, the trough member 100 may be snap-fitted with any combination of the modular trough sections 10, 60, 70, 80, or 90 as described above in order to align the trough member with another misaligned trough member or in order to avoid a obstructing object.

Figure 17:
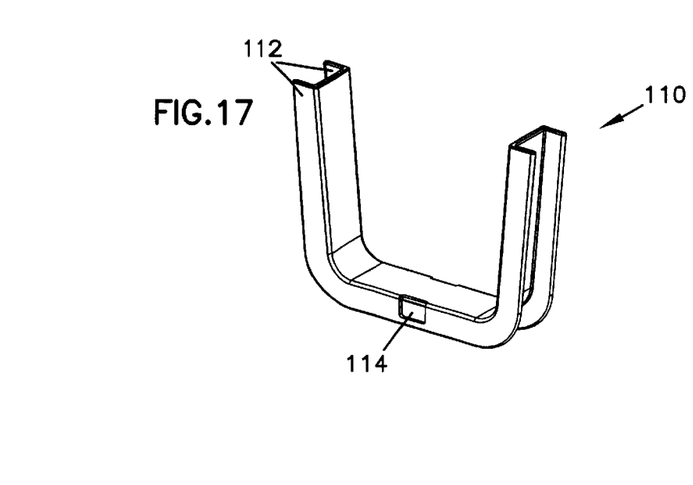
FIG. 17 is a perspective view of a modular trough section incorporating two flanged ends according to the present invention.
Figures 18, 19:
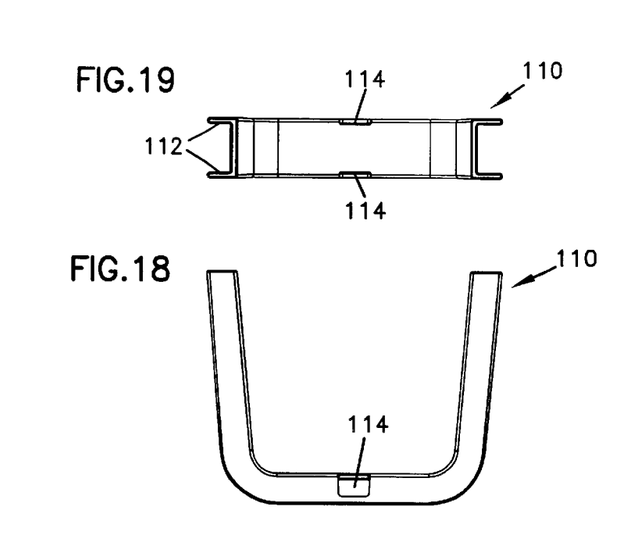
FIG. 18 is an end view of the trough section of FIG. 17.
FIG. 19 is a top view of the trough section of FIG. 17.

Double flange modular trough section 110 in FIGS. 17–19 may be used with a trough member having a receiving channel such as trough member 100 with channel 102, in order to provide a flanged end for coupling to other modular trough sections. Double flanged modular trough member 110 has flanges 112 on each end. Each flange 112 defines a retention slot 114 for retaining the flange 112 in a receiving channel.

FIGS. 20 and 21 show an assembly 200 of modular trough sections according to the present invention. The assembly starts with a linear trough member 100 terminating in a receiving channel. The trough member 100 is coupled to a double-flanged modular trough section 110 which is also coupled to an angled trough section 70. The angle trough section 70 is coupled to a straight modular trough section 10 which is also coupled to a second angled trough section 60. The second angled trough section 60 is then coupled to another linear trough section 100'. The assembly 200 shifts the cable pathway defined by linear trough member 100 to the right by a distance X to be received by the linear trough member 100'.

FIGS. 22 and 23 show a second assembly 300 of modular trough sections which incorporates a linear trough member 100, an upwardly angled trough section 90, a straight trough section 10, a downwardly angled trough section 80, a double flanged trough section 110, and a second linear trough member 100'. The assembly 300 shifts the cable pathway of linear trough member 100 upward a distance Y to align with linear trough member 100'.

In both assemblies 200 and 300 the upstanding walls and bottom walls of each trough member and trough section define a contiguous cable pathway which at no point bends more sharply than the minimum bend radius of the cable. This serves the important cable protecting function of a cable management system.

The modular cable trough sections described above may be quickly assembled in any desired combination to realign the cable pathway or to avoid obstructions. Other combinations besides those shown are easily configured. For example, by combining the interior components of assemblies 200 and 300, both a horizontal shift and a vertical shift in the same trough section is possible. Further, the amount of the shift can be increased by adding more straight modular trough sections 10 and/or adding more angled trough sections 60, 70, 80, 90. By including receiving channels or their matching flanges on the trough sections or trough members the modular trough sections according to the present invention may be quickly incorporated in to any cable management system. Further the modular construction allows for flexibility during on-site assembly, and a reduction in the number of parts that need to be stocked by a supplier. The modular construction also allows for more efficient trough systems since obstructions can be avoided without having to resort to conventional 45 or 90 degree elbows.

Figure 24:
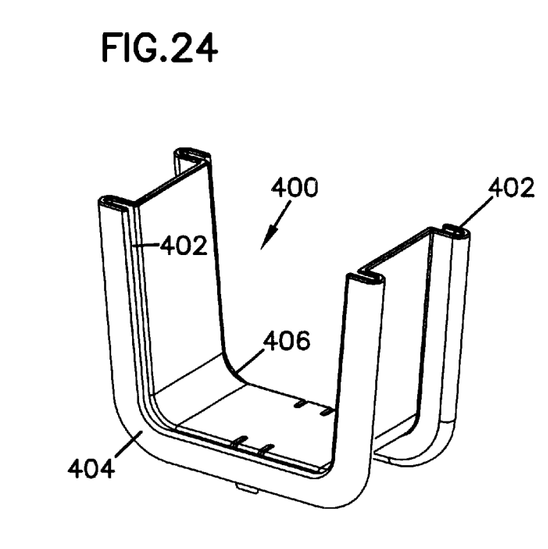
FIG. 24 is a perspective view of a modular trough section having receiving channels at both ends according to the present invention.

FIG. 24 is a modular trough section 400 having receiving channels 402 at both ends 404 and 406. Such a design is useful to join two components both of which end in flanged ends. One situation where that might arise is if trough members 100 and 100' include flanges at their ends instead of receiving channels.

The above specification, examples and data provide a description of the invention. Since many embodiments of the invention can be made without departing from the spirit and scope of the invention, the invention resides in the claims hereinafter appended.

What is claimed is:

1. A modular cable management trough section comprising:
   a trough body defining:
      first and second ends;
      first and second upright walls extending between the first and second ends;
      a base wall between the first and second upright walls, extending between the first and second ends; the first and second upright walls and the base wall defining a generally U-shaped trough having an open top and a trough interior for receiving at least one telecommunications cable;
      a receiving channel disposed at the first end of the trough body; the channel having upright portions along the first and second upright walls and a base portion along the base wall; the channel configured to slidably receive a flanged end of an adjacent trough section; wherein the flanged end of the adjacent trough section may be coupled to the first end of the modular trough section by sliding the flanged end into the receiving channel.

2. The modular cable management trough section of claim 1 wherein the trough body further defines:
   a retaining tab in the base portion of the receiving channel, the retaining tab defining a first ledge that in cooperation with a second ledge disposed on the flanged end of the adjacent trough section acts to retain the flanged end of the adjacent trough section within the receiving channel of the modular trough section; the retaining tab including a push-surface which when depressed releases the first ledge from the second ledge and allows the flanged end of the adjacent trough section to be removed from the receiving channel.

3. The modular cable management trough section of claim 1 wherein the second end of the trough body defines a flange; the flange flaring away from the trough interior, the flange having upright portions along the first and second upright walls and a base portion along the base wall, wherein the flange is configured to be received by a receiving channel of an adjacent trough section.

4. The modular cable management trough section of claim 3 wherein the base portion of the flange defines a retention slot; the retention slot having a first ledge, wherein the first ledge in cooperation with a second ledge disposed in the receiving channel of the adjacent trough section acts to retain the flange inside the receiving channel of the adjacent trough section.

5. The modular cable management trough section of claim 1 wherein the trough body further defines a second receiving channel disposed at the second end of the trough body; the second channel having upright portions along the first and second upright walls and a base portion along the base wall; the second channel configured to slidably receive a flanged end of a second adjacent trough section; wherein the flanged end of the second adjacent trough section may be coupled to the second end of the modular trough section by sliding the flanged end into the second receiving channel.

6. The modular cable management trough section of claim 5 wherein the trough body further defines:
   first and second retaining tabs in the base portions of each receiving channel respectively, each retaining tab defining a first ledge that in cooperation with a second ledge disposed on the flanged end of adjacent trough sections acts to retain the flanged end of the adjacent trough section within the receiving channel of the modular trough section; each retaining tab including a push-surface which when depressed releases the first ledge from the second ledge and allows the flanged end of the adjacent trough section to be removed from the respective receiving channel.

7. The modular cable management trough section of claim 1 wherein the second end and the receiving channel lie in first and second planes and wherein the first plane is at an angle relative to the second plane.

8. A modular cable management trough section comprising:
   a trough body defining:
      first and second ends;
      first and second upright walls extending between the first and second ends;
      a base wall between the first and second upright walls, extending between the first and second ends; the first and second upright walls and the base wall defining a generally U-shaped trough having an open top and a trough interior for receiving at least one telecommunications cable;
      a flange disposed at the first end of the trough body, the flange flaring away from the trough interior, the flange having upright portions along the first and second upright walls and a base portion along the base wall, wherein the flange is configured to be received by a receiving channel of an adjacent trough section; the base portion of the flange defining a retention slot; the retention slot having a first ledge, wherein the first ledge in cooperation with a second ledge disposed in the receiving channel of the adjacent trough section acts to retain the flange inside the receiving channel of the adjacent trough section.

9. The modular cable management trough section of claim 8 wherein the second end of the trough body defines a second flange, the second flange flaring away from the trough interior, the second flange having upright portions along the first and second upright walls and a base portion along the base wall, wherein the second flange is configured to be received by a receiving channel of a second adjacent trough section; the base portion of the second flange defining a retention slot; the retention slot having a first ledge, wherein the first ledge in cooperation with a second ledge disposed in the receiving channel of the second adjacent trough section acts to retain the second flange inside the receiving channel of the second adjacent trough section.

10. A cable management trough assembly comprising:
a first trough section having a trough body, the trough body defining:
first and second ends;
first and second upright walls extending between the first and second ends;
a base wall between the first and second upright walls, extending between the first and second ends; the first and second upright walls and the base wall defining a generally U-shaped trough having an open top and a trough interior for receiving at least one telecommunications cable; and
a receiving channel disposed at the first end of the trough body; the channel having upright portions along the first and second upright walls and a base portion along the base wall; the channel configured to slidably receive a flanged end of an adjacent trough section;
a second trough section adjacent the first trough section, the second trough section having a second trough body, the second trough body defining:
first and second ends;
first and second upright walls extending between the first and second ends;
a base wall between the first and second upright walls, extending between the first and second ends; the first and second upright walls and the base wall defining a generally U-shaped trough having an open top and a trough interior for receiving at least one telecommunications cable; and
a flange disposed at the first end of the trough body, the flange flaring away from the trough interior, the flange having upright portions along the first and second upright walls and a base portion along the base wall, wherein the flange is received by the receiving channel of the first trough section;
a reciprocal retention arrangement on each of the first and second trough sections, wherein the reciprocal retention arrangements engage one another to retain the first and second trough sections together.

11. The assembly of claim 10, wherein the reciprocal retention arrangement includes the base portion of the flange defining a retention slot; the retention slot having a first ledge, wherein the first ledge in cooperation with a second ledge disposed in the receiving channel of the first trough section acts to retain the flange inside the receiving channel of the first trough section.

12. A method for coupling cable management trough sections comprising the steps of:
providing a first trough section including a receiving channel with a retaining tab, and the second trough section includes a flange;
sliding the flange of the second trough section into the receiving channel of the first trough section;
engaging a retaining arrangement of the first trough section with a retaining arrangement of the second trough section.

13. The method of claim 12, further comprising the steps of: sliding a flange of a third trough section into a receiving channel of the second trough section;
engaging a retaining arrangement of the third trough section with a second retaining arrangement of the second trough section.

14. A modular cable management trough section comprising:
a U-shaped trough including a base wall and first and second upright sidewalls, the base wall extending between the first and second upright sidewalls; the U-shaped trough having an open top and a trough interior for receiving at least one cable;
wherein the first and second upright sidewalls define first and second vertical receiving channels respectively disposed at a first end of the trough; the channels configured to slidably receive a flanged end of an adjacent trough section also having a trough interior; wherein the flanged end of the adjacent trough section may be coupled to the first end of the modular trough section by sliding the flanged end downwardly into the receiving channel so that trough interior of the trough section communicates with the trough interior of the adjacent trough section.

15. The modular cable management trough section of claim 14 wherein the base wall defines a horizontal receiving channel for receiving a portion of the flanged end of the adjacent trough section.

16. The modular cable management trough section of claim 15 further comprising a retaining tab in the horizontal receiving channel, the retaining tab defining a first ledge that in cooperation with a second ledge disposed on the flanged end of the adjacent trough section acts to retain the flanged end of the adjacent trough section within the receiving channel of the modular trough section.

* * * * *

UNITED STATES PATENT AND TRADEMARK OFFICE
CERTIFICATE OF CORRECTION

PATENT NO.    : 6,470,129 B1
DATED         : October 22, 2002
INVENTOR(S)   : Wentworth et al.

It is certified that error appears in the above-identified patent and that said Letters Patent is hereby corrected as shown below:

<u>Title page,</u>
Item [56], References Cited, U.S. PATENT DOCUMENTS, please insert
-- 2,834,622, 05/1958, Reeves; and 5,917,982, 06/1999, Vargas et al. --

FOREIGN PATENT DOCUMENTS, please insert -- 0998000 A2, 05/2000, Europe; 26800206, 02/1993, France; and 2212339 A, 07/1989, Great Britain --

Signed and Sealed this

Twentieth Day of May, 2003

JAMES E. ROGAN
*Director of the United States Patent and Trademark Office*